No. 820,041. PATENTED MAY 8, 1906.
A. B. FERDINAND.
MEANS FOR ACTUATING SIGNALS.
APPLICATION FILED SEPT. 8, 1903.

2 SHEETS—SHEET 2.

UNITED STATES PATENT OFFICE.

ANTHONY B. FERDINAND, OF MILWAUKEE, WISCONSIN.

MEANS FOR ACTUATING SIGNALS.

No. 820,041.         Specification of Letters Patent.         Patented May 8, 1906.

Application filed September 8, 1903. Serial No. 172,192.

*To all whom it may concern:*

Be it known that I, ANTHONY B. FERDINAND, a citizen of the United States, and a resident of Milwaukee, in the county of Milwaukee and State of Wisconsin, have invented certain new and useful Improvements in Means for Actuating Signals; and I do hereby declare that the following is a full, clear, and exact description thereof.

My invention relates to means for giving an automatic signal when a pneumatic tire becomes more or less flattened by reason of excessive load in the vehicle to whose wheel it is attached, or more or less deflated by leakage, puncture, or otherwise; and to that end it consists in certain peculiarities of construction and combination of parts, as will be fully explained hereinafter in connection with the accompanying drawings, and subsequently claimed.

Figure 1:
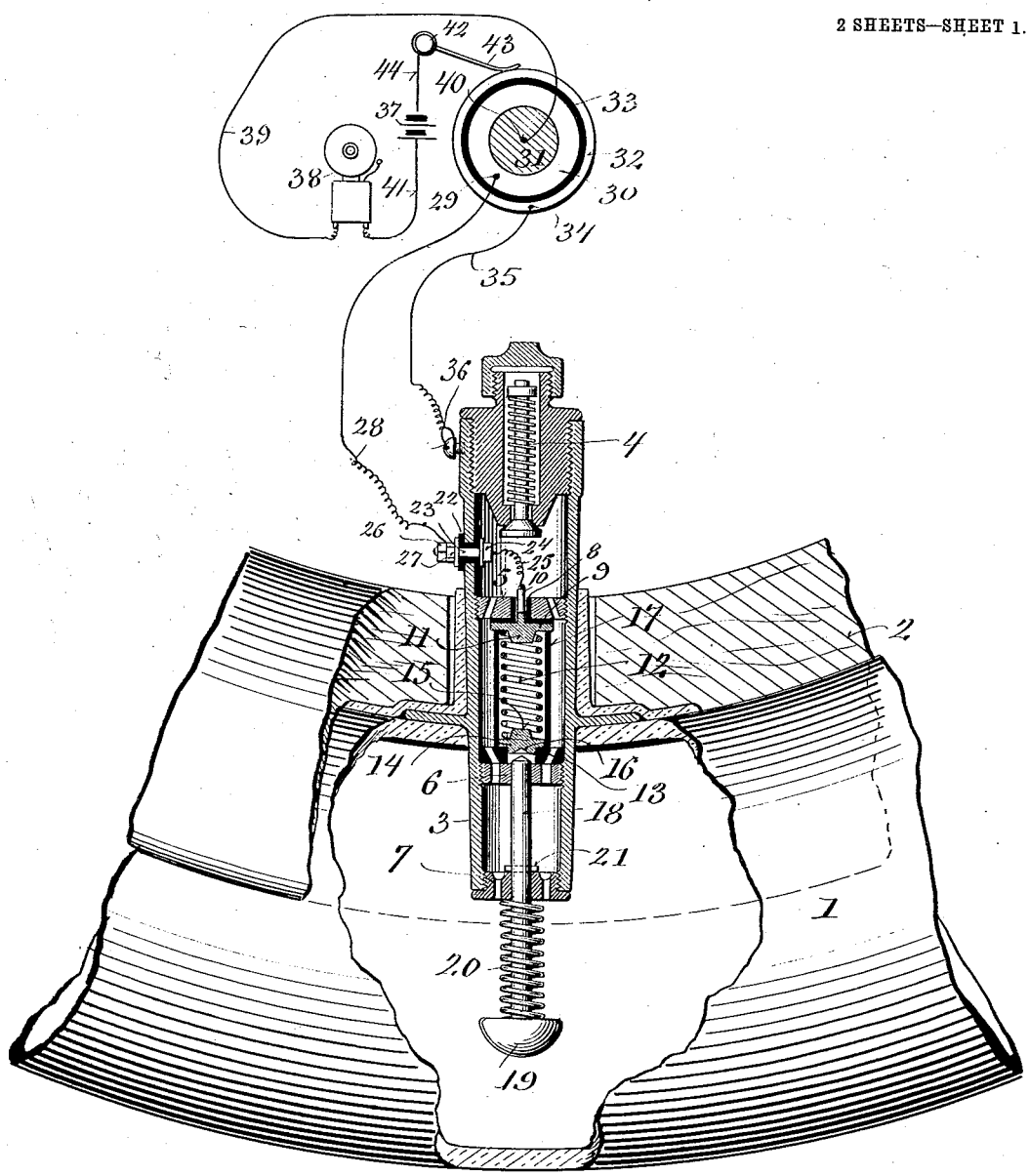
Figure 2:
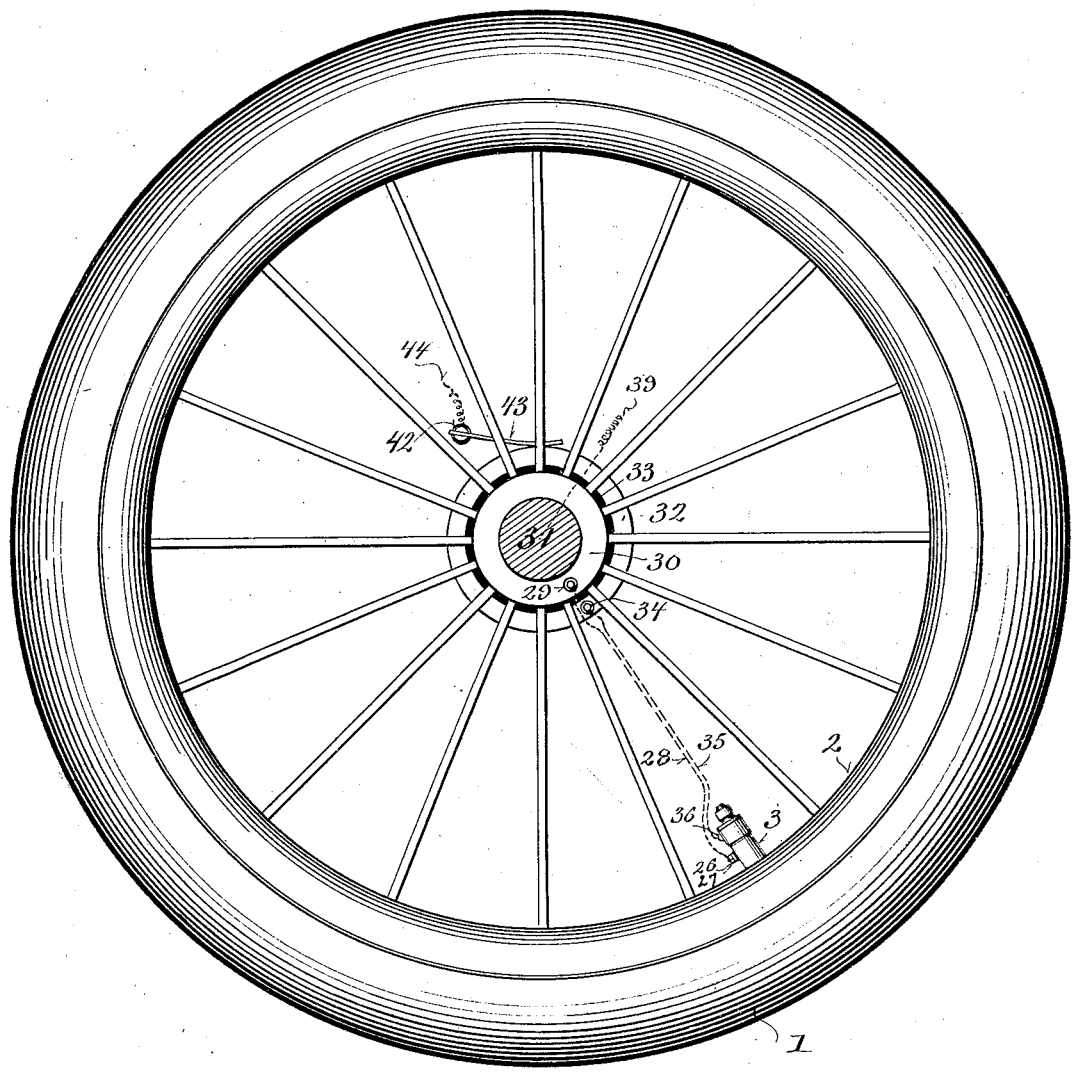

In the said drawings, Figure 1 is a partly-sectional view of a portion of a wheel-rim and pneumatic tire with a sectional view of one form of my device applied thereto and with a diagrammatic view of electrical connection between said device and the wheel-hub and axle, the latter being also shown in section and, like the hub, on a reduced scale, and the spokes between the hub and rim being omitted to prevent obscuring the drawings. Fig. 2 is a view in side elevation, of a wheel equipped with my invention.

Referring by numerals to said drawings, 1 represents a pneumatic tire, (the one shown being a single-tube tire, though this is not material,) and 2 the wheel-rim to which the said tire is attached in the ordinary manner, while 3 designates a cylindrical tube, passing through the rim and into the tire and provided with a check-valve 4 at its inner end, these parts so far being the same as in the ordinary filling-valve common with pneumatic tires.

In my device the filling-tube 3 is formed with interior screw-threads for the engagement therewith of the casing of the check-valve 4 at one end, the intermediate metal disks 5 and 6, and the cap-piece 7 at the other end, which is within the tire, the said disks 5 and 6 and the cap-piece 7 being formed with air-channels therethrough, as shown. The disk 5 is formed with a central hole therethrough, the wall of which is fitted with a flanged insulating-thimble 8, the flange of which covers part of one side of said disk 5 up to the line of the described air-channels, and against this insulating-flange is placed a metal plate 9, having an integral post 10, projecting up through the insulated central hole of the disk 5, and on its opposite side a central boss 11, which fits within one end of a coiled metal spring 12. Resting against the disk 6 is a rubber or other insulating ring 13 of a diameter to just fit within the tube 3, and formed with air-channels therethrough which register with those in the said disk 6, and resting against said ring 13 is a metal plate 14, having on one side a central boss 15, which is received within the other end of the said coiled spring 12, a tube 17, of rubber or similar insulating material, surrounding said spring 12 between the plate 9 and ring 13. The plate 14 on its opposite side is formed with another boss, which projects within the described insulating-ring 13 and is formed with a central socket 16 in line with and adapted to receive at the proper time the adjacent pointed end of a push-rod 18, which has movement through a central hole in the cap-piece 7, this rod 18 terminating in a rounded head 19. Between this head 19 and the adjacent side of the cap-piece 7 the said rod 18 is surrounded by a coiled spring 20, and the said rod is kept from dropping out of place by a transverse pin 21, which normally bears against the opposite side of the said cap-piece 7.

Just inside the line of the rim 2 the tube 3 is formed with a hole therethrough fitted with an insulating-bushing 22, through which passes a metal bolt 23, whose head 24 is inside the tube 3, and is connected by wire 25 with the end of the post 10 on the plate 9. The outer end of the bolt 23 is fitted with jam-nuts 26 27, from which a wire 28 extends to a binding-post 29 on the wheel-hub 30, said hub being of metal and revolving on a metal axle 31. Fast on said hub 30 is a metal band 32, with an insulating-ring 33 interposed between said hub and band, and on the edge of this band 32 is a binding-post 34, from which a wire 35 runs to a binding post or screw 36 on the tube 3.

At any convenient point within or upon the vehicle bearing the wheels having said pneumatic tires there is located a battery 37 and electric bell 38 or other suitable alarm, electrically connected together by wire 41 and by wire 39 to a binding-post 40 on the axle 31 and by wire 44 to the binding-post 42 and the brush 43, which brush has contact with the revolving metal band 32, carried by the hub 30, but which, as stated, is insulated therefrom.

The operation of my invention will be readily understood from the foregoing description and the accompanying drawings. If from any cause the tire commences to flatten, as soon as the wheel thereby becomes sufficiently depressed the head 19 of the push-rod 18 comes in contact with the inner surface of the tire, which is at that moment below it, and this in the further depression of the wheel forces the push-rod 18 into contact with the plate 14, thereby closing the circuit and sounding the alarm 38, thus giving notice that the tire requires immediate reinflation, and thus guarding against injury consequent upon travel with a collapsed, punctured, or deflated tire.

In place of the particular bell or alarm shown any other signal may be employed, either visual or audible, which would be put into operation by the contact of the flattening, collapsing, or deflating tire with the movable rod of the operating mechanism, and hence my invention is not limited to the specific details of construction herein set forth, which may be varied as desired within the scope of my claims.

Having thus described my invention, what I claim as new, and desire to secure by Letters Patent, is—

1. The combination with a wheel having an inflatable tire, of signal mechanism associated with said tire, a casing projected into said tire and forming a part of said signal mechanism, and a rod mounted in said casing and adapted to be actuated by said tire when the latter is partially deflated to render the signal mechanism operative.

2. The combination with a wheel having an inflatable tire, of electrical signal mechanism associated with said tire, a casing projected into said tire and forming a part of said signal mechanism, and a rod mounted in said casing and adapted to be actuated by said tire when the latter is partially deflated, said rod serving to close the circuit of said signal mechanism to render the latter operative.

3. The combination with a wheel having an inflatable tire, of electrical signal mechanism associated with said tire, a casing projected into said tire and forming a part of the circuit of said signal mechanism, a contact arranged in said casing but insulated therefrom, and a rod mounted in said casing and adapted to be actuated by said tire when the latter is deflated, said rod coöperating with said contact to close the circuit of said signal mechanism to render the latter operative.

4. The combination with a wheel having an inflatable tire, of electrical signal mechanism associated with said tire, a casing projected into said tire and forming a part of the circuit of said signal mechanism, a contact yieldingly mounted in said casing but insulated therefrom, and a rod mounted in said casing and adapted to be actuated by said tire when the latter is deflated, said rod coöperating with said contact to close the circuit of said signal mechanism to render the latter operative.

In testimony that I claim the foregoing I have hereunto set my hand, at Milwaukee, in the county of Milwaukee and State of Wisconsin, in the presence of two witnesses.

ANTHONY B. FERDINAND.

Witnesses:
H. G. UNDERWOOD,
E. W. HELLER.